Feb. 6, 1962     B. A. WORSWICK     3,019,650
APPARATUS FOR DETECTING THE PRESENCE OR ABSENCE AT
A LOCATION OF A BODY OF LIQUID
Filed April 1, 1958     2 Sheets-Sheet 1
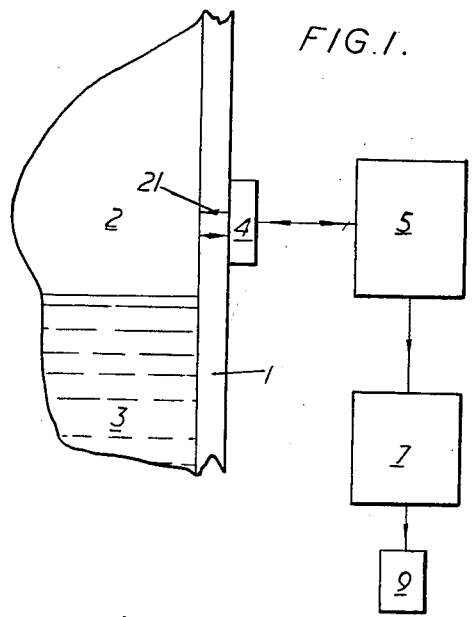
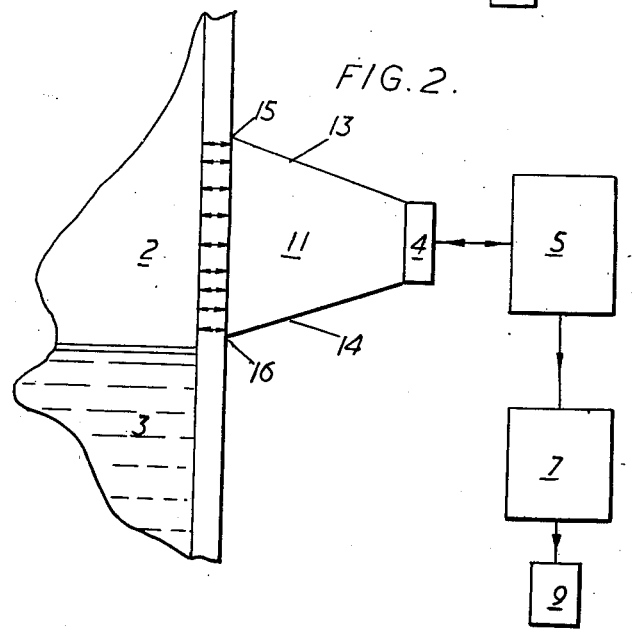
Inventor
Bernard A. Worswick
By
Pennie, Edmonds, Morton, Barrows and Taylor
Attorneys Feb. 6, 1962   B. A. WORSWICK   3,019,650
APPARATUS FOR DETECTING THE PRESENCE OR ABSENCE AT
A LOCATION OF A BODY OF LIQUID
Filed April 1, 1958   2 Sheets-Sheet 2
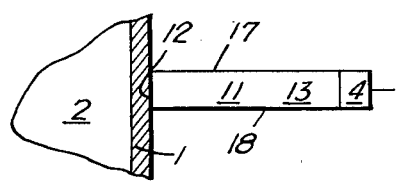
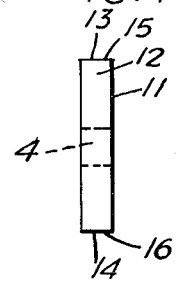
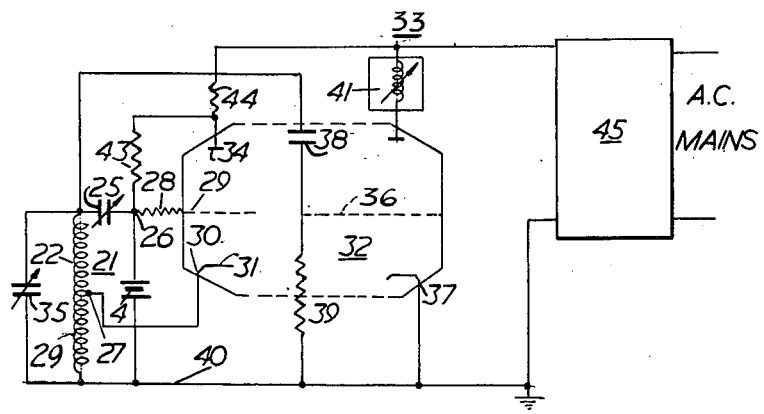
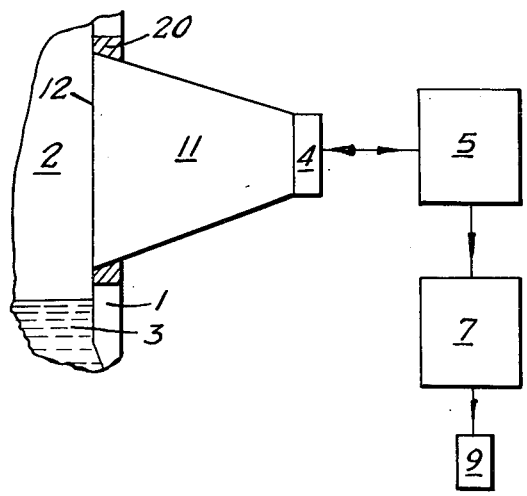
Inventor
Bernard A. Worswick
By
Pennie Edmonds, Morton, Barrows and Taylor
Attorneys United States Patent Office 3,019,650
Patented Feb. 6, 1962

3,019,650
APPARATUS FOR DETECTING THE PRESENCE OR ABSENCE AT A LOCATION OF A BODY OF LIQUID
Bernard A. Worswick, Croydon, England, assignor to Bailey Meters & Controls Limited, Croydon, England, a British company
Filed Apr. 1, 1958, Ser. No. 725,742
Claims priority, application Great Britain Apr. 1, 1957
24 Claims. (Cl. 73—290)

The present invention relates to apparatus for detecting the presence or absence of a body of liquid, at a location, for instance, at one side of a wall such as the wall of a pipe or storage tank, and for indicating the level of the liquid between upper and lower limits.

Thus, for example, the apparatus is useful in determining whether the liquid within a container is above or below a predetermined level and, within upper and lower limits for determining the difference of the level of the body of liquid from the predetermined level.

It is an object of the invention to provide apparatus for detecting the presence or absence, at a location, of a body of liquid and for indicating the level between upper and lower limits which includes a transducer adapted to transmit ultrasonic energy into the liquid and signal receiving means adapted to be influenced by ultrasonic energy reflected back from a liquid contacting surface at the location extending between the said upper and lower limits of level.

Another object is to provide apparatus in which the transducer forms part of the signal receiving means.

Another object is to provide apparatus including a transducer mounted at one end of a transmitter rod which at its other end extends between the upper and lower limits of level.

Further objects and advantages of the invention will be apparent from the subsequent description of the invention.

The invention will now be described, with reference, by way of example, to the accompanying diagrammatic drawings, in which:

FIGURE 1 is an arrangement of apparatus according to the invention for detecting the presence or absence, at a location, of a body of liquid retained behind a tank wall;

FIGURE 2 is an arrangement similar to FIGURE 1 of a further embodiment;

FIGURE 3 is a plan view of FIGURE 2;

FIGURE 4 is an end view of FIGURE 2;

FIGURE 5 is an arrangement showing a modification of FIGURE 2; and

FIGURE 6 is the circuit diagram of an oscillator adapted to drive a current responsive device in response to variation in the intensity of ultrasonic energy received by a transducer.

In FIGURE 1 a piezo-electric transducer 4 is mounted on the side wall of a container 2 for a liquid 3. The transducer is adapted to be energised by means of an oscillator 5 and to receive ultrasonic energy so as to effect oscillations in the oscillator circuit. The oscillator 5 is connected by way of an amplifier 7 to a current sensitive device 9. The current sensitive device may, for example, be a meter adapted to give a reading in response to current and calibrated to give the height of the level of the body of liquid 3 when that level is between upper and lower limits corresponding to the upper and lower edges of the transducer 4. The transducer 4 is suitably coupled to the wall by a resin such as "Araldite" which provides a good acoustic connection.

In FIGURES 2, 3 and 4 like reference numerals refer to similar parts in FIGURE 1. In this embodiment the transducer 4 is mounted on the outer end of a transmitter rod 11, the inner end of which is mounted on the outer face of the wall 1 so that the inner end face of the rod 11 is contiguous with the outer wall face. The transmitter rod 11 is flared outwardly towards its inner end to provide an inner end face 12 of enlarged dimensions. Suitably, the transmitter rod is formed with parallel sides 17 and 18 as is shown in FIGURE 3 and with the inclined upper and lower faces 13 and 14 arranged to provide a narrow inner end face 12 of rectangular or substantially rectangular cross-section. The inner end face 12 is arranged to extend from the upper to the lower limit of level so that respective upper and lower edges 15 and 16 of the inner end face 12 define the upper and lower limits of level. Suitably the rod 11 is cemented to the wall by the resin "Araldite" or alternatively is face welded thereto.

In the modification of FIGURE 5 the transmitter rod 11 is mounted in an aperture 19 formed in the side wall 1 so that the inner end face 12 of the transmitter rod 11 is co-planar with the inner surface of the wall 1. The rod 11 is ultrasonically insulated from the wall by means of insulating material 20 forming an inner peripheral lining to the aperture, supporting the rod 11 and forming a seal against leakage of liquid from the container 2. A suitable insulating material is rubber or cork.

The transmitter rod may be any good conductor of ultrasonic energy such as mild or stainless steel but if the liquid to be sensed is subject to temperature variation the rod should also be an insulator against heat, for example, Perspex.

In operation of the embodiment of FIGURE 1, when the oscillator 5 oscillates the transducer 4 is energised at ultrasonic frequency and ultrasonic vibrations are transmitted through the wall 1 as shown by the arrow 21.

When no liquid is present at the wall portion defined by the area of contact with the transducer 4, the ultrasonic energy is reflected from the wall inner surface as shown by the arrow 22 and falls once again on the transducer face. The energy fall on the transducer in this way affects the amplitude of oscillations dependent on the intensity of the energy reflected back. Suitably, the oscillator is adapted to oscillate at maximum amplitude when the level of liquid is below the transducer 4.

As the level of liquid rises to the level of the transducer 4 the condition of the oscillator 5 remains unchanged until the level of liquid reaches the level of the transducer 4, when ultrasonic energy is conducted away in the liquid and the energy reflected back to the transducer is reduced.

The effect of the transducer 4 on the oscillator 5 is to reduce the amplitude of oscillations in dependence upon the level of liquid with respect to the lower limit of level of the transducer 4. Suitably, the oscillator 5 is so arranged that when the level of liquid is the same as the upper limit of the transducer 4, oscillations cease.

Variation of the level of liquid across the transducer 4 is detected by the current sensitive device 9 which is fed by the amplifier 7. The variation of amplitude of oscillation in the oscillator circuit causes variation in the current flow through the amplifier 7 and operates the device 9 accordingly. The current sensitive device 9 may, for example, be a meter adapted to respond to variation in current and calibrated to give the level of liquid above the lower limit of the transducer 4 as a percentage of the distance between the upper and lower limits of the transducer. Alternatively, for further example, the current sensitive device 9 may be a control device adapted to operate means for supplying or evacuating liquid from the container so that the level of liquid in the container may be kept within desired limits.

The response of the device 5 in either of the above examples may conveniently be non-linear with respect to variation in level of the liquid, but if desired the response may be made linear, in well known manner, by suitably matching the device 9, amplifier 7 and the oscillator 5 with the transducer 4.

In operation of the embodiment of FIGURES 2 to 4, energisation of the transducer 4 causes ultrasonic energy to be transmitted from the rod 11 substantially uniformly over the area of the inner end face 12 thereof, thus detection of level may take place over a wider range than with the arrangement of FIGURE 1.

In the modification of FIGURE 5 the inner face 12 of the rod 11 is in intimate contact with the liquid when the liquid is at a level between the upper and lower limits of the rod 11. Thus losses of energy due to transmission through the wall are avoided, and where great sensitivity is desired this arrangement is most suitable.

A suitable oscillator circuit for operation of the embodiments of FIGURES 1 to 5 is shown in FIGURE 6 in which the oscillator is adapted for operation from an alternating mains supply through a rectifying unit 45. The transducer 4 is connected electrically in the oscillator circuit as one arm of a balanced electrical feedback bridge 21. Sections 22 and 23 of a coil 24 form, with a variable capacitor 25 the other arms of the bridge 21. The balance points 26 and 27 of the bridge are respectively connected by way of a resistor 28 to the grid 29 and to the cathode 30 of a triode valve suitably forming one half 31 of a double triode valve, the other half 32 providing an amplifier stage equivalent to 7 of FIGURE 1.

The balance of the bridge 21 is adjusted by means of variable capacitor 25 so that when the liquid level is below the upper limit of level the valve part 31 is conducting, feedback to the grid 29, due to the coil part 23 being in the valve anode 34 to cathode 30 path, is maintained positive and in phase so that oscillations in the circuit are maintained. A capacitor 35 in parallel with the capacity formed by the capacitor 25 and the transducer 4 in series is chosen to tune the coil 24 to the desired frequency of oscillation, suitably a resonant frequency or mode of the transducer. In the arrangement of FIGURE 1 the upper limit of level corresponds to the upper edge of the transducer and in the arrangements of FIGURES 2 to 5 the upper limit corresponds to the upper edge of the transmitter rod 11 adjacent the wall 1, and if the liquid level rises above the upper limit of level the balance point of the bridge network is passed and oscillation ceases.

The oscillator is connected to the amplifying stage 33 with the coil 24 across the grid 36 and cathode 37 of the triode 32. Thus, the coil part 22 is connected at its end remote from the balance point 27 by way of a capacitor 38 and resistor 39 to an earth line 40 for the oscillator and amplifier stages of the circuit, and the grid 36 of the amplifying stage valve 32 is connected to a point between the capacitor 38 and the resistor 39 so that a resistive capacitance coupling 38, 39 is provided between the oscillator and the amplifier stage 33.

A current sensitive device 41 which may as described above be a meter or current operated controller, is connected in the anode circuit of the amplifying stage valve 32 and is adapted to operate in response to the current flowing through the valve 32.

Suitably, the oscillator and amplifier valves are energised from a common supply, for example, as is shown from alternating current mains through the rectifier 45.

When the liquid is below the level of the transducer, ultrasonic energy is reflected back to the transducer and alters the specific inductive capacity thereof so that the oscillator oscillates at maximum amplitude and the grid 36 of the amplifying stage valve part 32 is biassed so that the valve part 32 is cut off and does not conduct so that current does not flow through the device 41.

When liquid rises to the level of the transducer the amplitude of oscillation is reduced as the level of liquid moves from the lower to the upper limit of level, and as the amplitude of oscillation drops so does the bias on the grid 36 of valve part 32 so that the valve part is no longer cut off but becomes conducting. Thus as the oscillation is reduced in amplitude the current flowing through the device 41 increases, and when the level of liquid is at the upper limit of level, the oscillation ceases and the maximum current flows through the device 41.

The resistor 43 helps to improve the sensitivity of the oscillator to the presence or absence of liquid from the location within the container defined by the upper and lower limits of the transducer, and suitably this resistor has a high value, of the order of $2.2 \times 10^6$ ohms.

In an arrangement in which the liquid to be sensed is subject to temperature variation, the circuit of FIGURE 6 may be modified to compensate for temperature variation. Thus the capacitor 35 may be shunted by other capacitors which are arranged to be switched in automatically by thermostatic switching devices.

A suitable material for piezo-electric transducers for the above is barium titanate, but where temperature variation is expected, zirconate titanate is more suitable. A further material is lead zirconate.

What I claim is:

1. Apparatus for detecting the presence or absence of a body of liquid at a location between upper and lower limits of level and for indicating the level of the body of liquid within said limits, comprising a solid body comprising a conductor of ultrasonic energy formed with a face adapted to extend between said upper and said lower limit of level to define the said location and to enter into liquid contacting relationship with the body of liquid when present at the said location, signal transmitter means mounted on the body and including a transducer adapted to be energised by means including an electric oscillator to propagate ultrasonic energy into the body towards said surface between said limits of level, signal receiving means adapted to be influenced by ultrasonic energy reflected back from said surface through said solid body to said signal receiving means and adapted to assume a condition of magnitude proportional to the intensity of said ultrasonic energy influencing the signal receiving means, and meter means adapted to effect a signal in dependence on the magnitude of the condition of the signal receiving means.

2. Apparatus as claimed in claim 1, wherein the said transducer forms part of the signal receiving means.

3. Apparatus as claimed in claim 2, wherein the transducer includes a body having piezo-electric qualities and a specific inductive capacity which varies with intensity of ultrasonic energy reflected back to the transducer and the change in specific inductive capacity as the level of the body of liquid varies between said upper and lower limits is adapted by varying the value of capacity in the oscillator circuit to determine the amplitude of oscillation therein.

4. Apparatus as claimed in claim 3, wherein the transducer is of a material from the group consisting of barium titanate, zirconate titanate and lead zirconate.

5. Apparatus as claimed in claim 3, wherein the oscillator circuit includes a balanced electrical bridge feedback network including a coil providing two arms of the bridge and the other arms respectively being provided by the transducer and an adjustable capacity.

6. Apparatus as claimed in claim 5, wherein capacitance means of adjustable value are connected across the bridge between ends of the coil.

7. Apparatus for detecting the presence or absence of a body of liquid in relation to a solid body at a location contiguous with a surface of the solid body extending between upper and lower limits of level and for indicating the level of the body of liquid within said limits, comprising signal transmitting means including a piezo-electric transducer mounted on the solid body and having a specific inductive capacity variable by impressing ultrasonic vibration thereon, the transducer being arranged to be energised by an electric oscillator for the propagation of ultrasonic energy into the solid body towards said surface between said upper and lower limits of level, the electric oscillator having a tuned circuit with a variable capacitance including said transducer adapted to control amplitude of oscillation of the circuit, signal receiving means connected with said circuit, responsive to electrical condition of the transducer and adapted to assume one condition with the body of liquid at the said location and consequent small reflection of ultrasonic vibrations from said surface to said transducer and another condition with the body of liquid absent from said location and consequent large reflection of ultrasonic vibrations from said surface to said transducer and intermediate conditions when the level of the body of liquid is intermediate the upper and lower limits of level and consequent intermediate amounts of ultrasonic vibrations are reflected back from said surface to the transducer, and meter means comprising a current sensitive device adapted to effect a signal in dependence on the amplitude of oscillation in the oscillation in the oscillator circuit.

8. Apparatus for detecting the presence or absence of a body of liquid at a location between upper and lower limits of level and adjacent the inner face of a side wall of a container for the body of liquid and for indicating the level of the body of liquid between said upper and lower limits, comprising transmitter means mounted on the outer face of the wall of the container opposite the said location and including a transducer adapted to be energised by means including an electric oscillator to propagate ultrasonic energy into the wall of the container towards the location and between said limits of level, and signal receiving means arranged to be influenced by ultrasonic energy reflected back from the inner face of the wall of the container and adapted to establish one condition when the level of the body of liquid is above the said location, another condition when the body of liquid is absent from the location and intermediate conditions when the level of the body of liquid is intermediate the said upper and lower limits of level, and meter means including a current sensitive device adapted to effect a signal in dependence on the magnitude of the condition of the signal receiving means.

9. Apparatus as claimed in claim 8, wherein the transducer and the electric oscillator are adapted to form part of the signal receiving means and the transducer is arranged to be influenced by ultrasonic energy reflected back from the inner face of the wall adapted to establish one condition in the oscillator circuit when the body of liquid is absent from the said location, to establish another condition when the level of the body of liquid is above the location, and intermediate conditions when the level of the body of liquid is intermediate the said upper and lower limits of level.

10. Apparatus as claimed in claim 9, in which the transmitter means includes a transducer mounted on the outer end of a transmitter rod mounted at its other end in ultrasonic conducting contact with the outer face of the said wall of the container opposite the location.

11. Apparatus as claimed in claim 9, wherein means are provided adapted to control the level of the body of liquid in dependence on the magnitude of the said condition and thereby determine the level of the body of liquid between said upper and lower limits.

12. Apparatus as claimed in claim 9, wherein the transducer includes a body having piezo-electric qualities and a specific inductive capacity which varies with changes in ultrasonic energy reflected back to the transducer and has different values in dependence on the level of the body of liquid between said upper and lower limits of level, and change in specific inductive capacity between said values is adapted by varying the values of capacity in the oscillator circuit to determine the amplitude of oscillation in the oscillator circuit.

13. Apparatus as claimed in claim 10, wherein the transmitter rod is flared from its outer to its inner end so that the inner end face is of larger area than the outer end face on which the transducer is mounted.

14. Apparatus as claimed in claim 13, wherein the transmitter rod is formed with inclined upper and lower faces and with parallel sides so that the inner end face is rectangular of width the same or substantially the same as the outer end face width but elongated vertically.

15. Apparatus as claimed in claim 12, wherein the oscillator circuit includes a balanced electrical bridge feedback network including a coil providing two arms of the bridge and the other arms respectively being provided by the transducer and an adjustable capacity.

16. Apparatus as claimed in claim 15, wherein capacitance means of adjustable value are connected across the bridge between the ends of the coil.

17. Apparatus as claimed in claim 12, wherein the transducer includes a body of material chosen from the following group consisting of barium titanate, zirconate titanate and lead zirconate.

18. Apparatus for detecting the presence or absence of a body of liquid at a location between upper and lower limits of level and adjacent the side wall of a container for the body of liquid and for indicating the level of the body of liquid between said upper and lower limits, the side wall being formed with an aperture at said location, comprising a transmitter rod formed with opposite end faces and flared from the outer end face to the inner end face so that the inner end face is of larger area than the outer end face, the rod extending at its inner end through the aperture and having upper and lower edges determining said limits of level and sealing means comprising ultrasonic insulating material providing a liquid-tight seal to the aperture, a transducer mounted on the outer end face of the transmitter rod, an electric oscillator adapted to energise the transducer to propagate ultrasonic energy into the transmitter rod, towards the inner end face thereof, and the transducer adapted to be influenced by ultrasonic energy reflected back from said inner end face to establish one condition in the oscillator circuit when liquid is absent from the location, another condition when the level of the body of liquid is above the location and intermediate conditions when the level of the body of liquid is intermediate the said upper and lower limits of level, and meter means including a current sensitive device adapted to effect a signal in response to the magnitude of the condition in the oscillator circuit.

19. Apparatus as claimed in claim 18, wherein the transmitter rod has inclined upper and lower faces and parallel sides so that the inner end face is rectangular and elongated in a vertical direction.

20. Apparatus as claimed in claim 19, wherein the transducer includes a body having piezo-electric qualities and a specific inductive capacity which varies with changes in ultrasonic energy reflected back to the transducer and has different values in dependence on the intensity of the energy reflected back, the intensity of energy reflected back varying with the level of the body of liquid between the upper and lower limits and change in specific inductive capacity is adapted by varying the value of capacity in the oscillator circuit to determine the amplitude of oscillation in the oscillator.

21. Apparatus as claimed in claim 19, wherein means are provided adapted to control the level of the body of liquid in dependence on the signal on the current sensitive device and thereby to determine the level of the body of liquid between said upper and lower limits.

22. Apparatus as claimed in claim 20, wherein the transducer includes a body of material chosen from the group consisting of barium titanate, zirconate, titanate, lead zirconate.

23. Apparatus as claimed in claim 21, wherein the oscillator circuit includes a balanced electrical bridge feedback network including a coil providing two arms of the bridge and the other arms respectively being provided by the transducer and an adjustable capacity.

24. Apparatus as claimed in claim 23, wherein capacitance means of adjustable value are connected across the bridge between ends of the coil.

References Cited in the file of this patent

UNITED STATES PATENTS

| | | |
|---|---|---|
| 1,380,869 | Fay | June 7, 1921 |
| 2,774,239 | Fitzgerald | Dec. 18, 1956 |

FOREIGN PATENTS

| | | |
|---|---|---|
| 932,401 | France | Mar. 22, 1948 |

OTHER REFERENCES

Periodical, Instruments and Automation, May 1957 issue, pages 886 and 887. (A photostatic copy is in Div. 36.)

Notice of Adverse Decision in Interference

In Interference No. 93,093 involving Patent No. 3,019,650, B. A. Worswick, Apparatus for detecting the presence or absence at a location of a body of liquid, final judgment adverse to the patentee was rendered Aug. 20, 1964, as to claims 1, 2, 3, 7, 8, 9, 11 and 12.

[*Official Gazette October 27, 1964.*]